United States Patent [19]

Hori

[11] Patent Number: 5,117,248

[45] Date of Patent: May 26, 1992

[54] LENS SHUTTER DEVICE FOR CAMERA

[75] Inventor: Masakatsu Hori, Tokyo, Japan

[73] Assignee: Asahi Kogaku Kogyo Kabushiki Kaisha, Tokyo, Japan

[21] Appl. No.: 707,964

[22] Filed: May 22, 1991

Related U.S. Application Data

[63] Continuation of Ser. No. 600,138, Oct. 19, 1990, abandoned, which is a continuation of Ser. No. 455,139, Dec. 22, 1989, abandoned.

[30] Foreign Application Priority Data

Dec. 28, 1988 [JP] Japan .................. 63-332091

[51] Int. Cl.⁵ .................. G03B 9/14; G03B 9/66
[52] U.S. Cl. .................. 354/234.1; 354/251; 354/264; 354/265
[58] Field of Search .......... 354/234.1, 251, 264, 354/265

[56] References Cited

U.S. PATENT DOCUMENTS

| | | | |
|---|---|---|---|
| 3,722,391 | 3/1973 | Kitai | 95/53 EB |
| 3,762,296 | 10/1973 | Rentschler | 95/53 EB |
| 3,854,143 | 12/1974 | Kitai et al. | 354/265 |
| 3,990,089 | 11/1976 | Urano | 354/242 |
| 4,452,521 | 6/1984 | Hirohata et al. | 354/195.1 |

FOREIGN PATENT DOCUMENTS

| | | |
|---|---|---|
| 3220266 | 2/1983 | Fed. Rep. of Germany . |
| 2122850 | 9/1972 | France . |
| 2237547 | 2/1975 | France . |
| 1043814 | 9/1966 | United Kingdom . |
| 1325225 | 8/1973 | United Kingdom . |
| 1414089 | 11/1975 | United Kingdom . |

OTHER PUBLICATIONS

French Search Report and Annex, Application No. FR 8917339, Sep. 19, 1991.

Primary Examiner—Michael L. Gellner
Attorney, Agent, or Firm—Sandler, Greenblum & Bernstein

[57] ABSTRACT

A lens shutter device for a camera including a shutter operating lever urged by a connecting spring in a direction in which shutter members are opened, and urged by a shutter closing spring in a direction in which the shutter members are closed. The connecting spring is provided to connect an opening cam contact lever moved by a shutter opening cam to the shutter closing lever, and allows a relative movement when an external force is exerted on the shutter closing lever. The shutter operating lever can be held by a high speed mode magnet. The shutter closing spring is provided between a camera body and a shutter closing lever, which is moved by a closing spring charge cam and engagable with the shutter operating lever, and the shutter closing lever can be held by a shutter closing magnet.

17 Claims, 10 Drawing Sheets

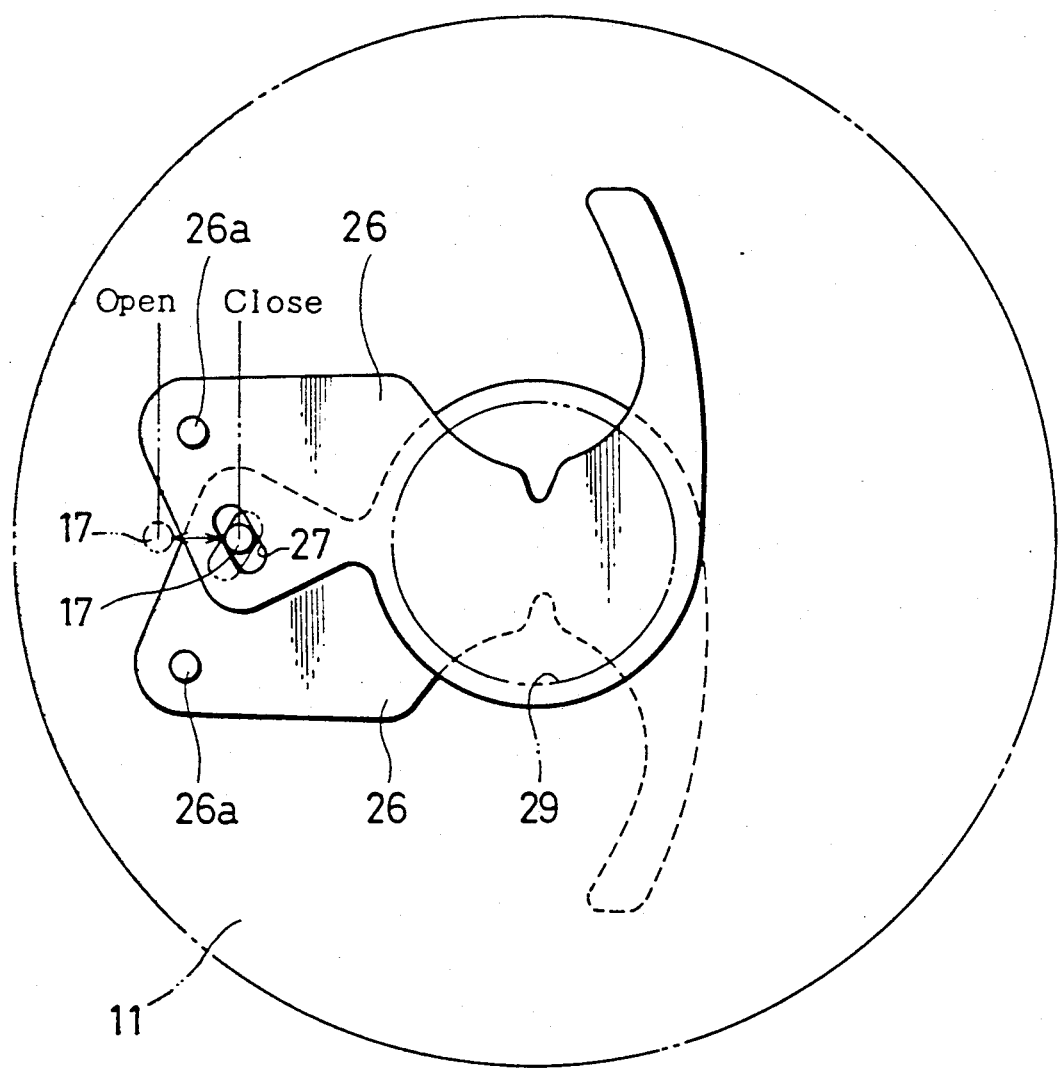

LENS SHUTTER DEVICE FOR CAMERA

This application is a continuation of application Ser. No. 07/600,138, filed Oct. 19, 1990, which is a continuation of application Ser. No. 07/455,139, filed Dec. 22, 1989, both now abandoned.

BACKGROUND OF THE INVENTION

1. Field of the Invention

The present invention relates to a lens shutter device, more particularly to a lens shutter device by which a high speed shutter operation is easily obtained.

2. Description of the Related Art

To meet the needs for miniaturization, high effectiveness, and lower costs, of a camera, conventionally lens shutter devices having various constructions or qualities, such as precise control achieved by using a stepping motor, reduction of costs by using a bimorph cell, and an automatic focusing and automatic exposure control by a single motor, have been proposed. With a lens shutter device having a stepping motor as a drive source, however, it is difficult to obtain a high torque and a high speed shutter operation, and if a bimorph cell is used as a drive source, due to the influence of a magnetic hysteresis, it is difficult to obtain an exact proportional relationship between the voltage and the displacement, and therefore, a precise control cannot be achieved. In a lens shutter device having an ordinary core motor as a drive source, a construction by which shutter sectors are open and closed by a rotation of the motor and by a spring force, is often adopted. However, since an ordinary motor rotates at a high speed and can not be accelerated with precise control, it is difficult to obtain a high speed shutter operation, and therefore, the high speed shutter operation is limited to about 1/500 sec. In particular, due to the lengthening of the focal length of lens and the increased diameter of the open aperture, the time required for the shutter to be fully opened, has become longer, which restricts the limits within which camera vibration can be ignored, and lowers the photographing range.

SUMMARY OF THE INVENTION

Therefore, the object of the present invention is to provide a lens shutter device having a simple construction using a smaller number of parts, whereby a high speed shutter operation not obtainable by a lens shutter device driven by a motor is easily obtained.

According to the present invention, there is provided a lens shutter device comprising a shutter operating lever, a first lever, a connecting spring, a closing spring, a second lever, a charging means, and a control means.

The shutter operating lever is moved to open and close the shutter members in accordance with the position of the shutter operating lever. A first lever is movable between a first position and a second position, and the connecting spring connects the first lever and the shutter operating lever so that the first lever and shutter operating lever are biased toward each other. The connecting spring allows the first lever and the shutter operating lever to move as one body when an external force is not exerted on the shutter operating lever, and allows a relative movement between the first lever and the shutter operating lever when an external force is exerted on the shutter operating lever. The spring force of the closing spring is stronger than that of the connecting spring.

The second lever is movable between a third position at which the second lever is engaged with the shutter operating lever and a fourth position at which the second lever is not engaged with the shutter operating lever. The second lever is urged by the closing spring to strike the shutter operating lever, and the charging means charges the closing spring by moving the second lever from the third position to the fourth position against the force of the closing spring. The control means holds the second lever at the fourth position, after the second lever is moved to the fourth position by the charging means. When a closing signal is input to the control means, it releases the second lever, which is then engaged with the shutter operating lever so that the shutter operating lever is moved by the closing spring toward a position at which the shutter members are closed.

The charging means for the second lever may be constructed by, for example, a charge cam in contact with and rotatable against the second lever, or a linearly moving lever moved linearly to and fro by the shutter closing lever.

As described above, the lens shutter device of the present invention is particularly advantageous in that a high speed shutter operation can be relatively easily obtained, because the second lever is operated by the force of the closing spring. Namely, the device is provided with the holding means in which, when the first lever is moved from the first position to the second position, movement of the shutter operating lever is restrained to charge the connecting spring, and in a high speed shutter mode, when a release signal is input to the control means, the restraint of the shutter operating lever is removed. Accordingly, the speed at which the shutter operating lever moves, not only to a position at which the shutter members are closed, but also to a position at which the shutter members are opened, is greatly increased, and thus a higher speed shutter operation is obtained.

The control means and holding means may be constructed as magnets for holding the second lever and the shutter operating lever, respectively.

The rotational angle of a shutter opening cam, i.e. the amount of movement of the shutter operating lever in a direction at which the shutter is closed, is preferably controlled in accordance with a subject brightness obtained by a photometric device. The shutter opening cam is preferably constructed in such a manner that the first lever is moved from the first position to the second position by one revolution of the cam.

When the charging means for the second lever is constructed as a charge cam, the configuration of the charge cam is perferably such that the second lever is moved from the third position to the fourth position by one revolution of the cam. Accordingly, no charging of the rotational direction of the cam is required, and thus the construction of the device is simplified.

If the charge cam and the shutter opening cam are constructed in such a manner that, when the charge cam is rotated for one revolution, the shutter opening cam is rotated for a number of times which is an integer of the revolution of the charge cam, and the initial positions of the charge cam and the shutter opening cam are set in such a manner, that when the charge cam is positioned at the fourth position the shutter opening cam is positioned at the second position, the lens shutter device of the present invention can be applied to a single-lens reflex camera.

BRIEF DESCRIPTION OF THE DRAWINGS

The present invention will be better understood from the description of the preferred embodiments of the invention set forth below, together with the accompanying drawings, in which:

FIG. 3 is a front view showing the shutter members;

DESCRIPTION OF THE PREFERRED EMBODIMENTS

Figure 1A:
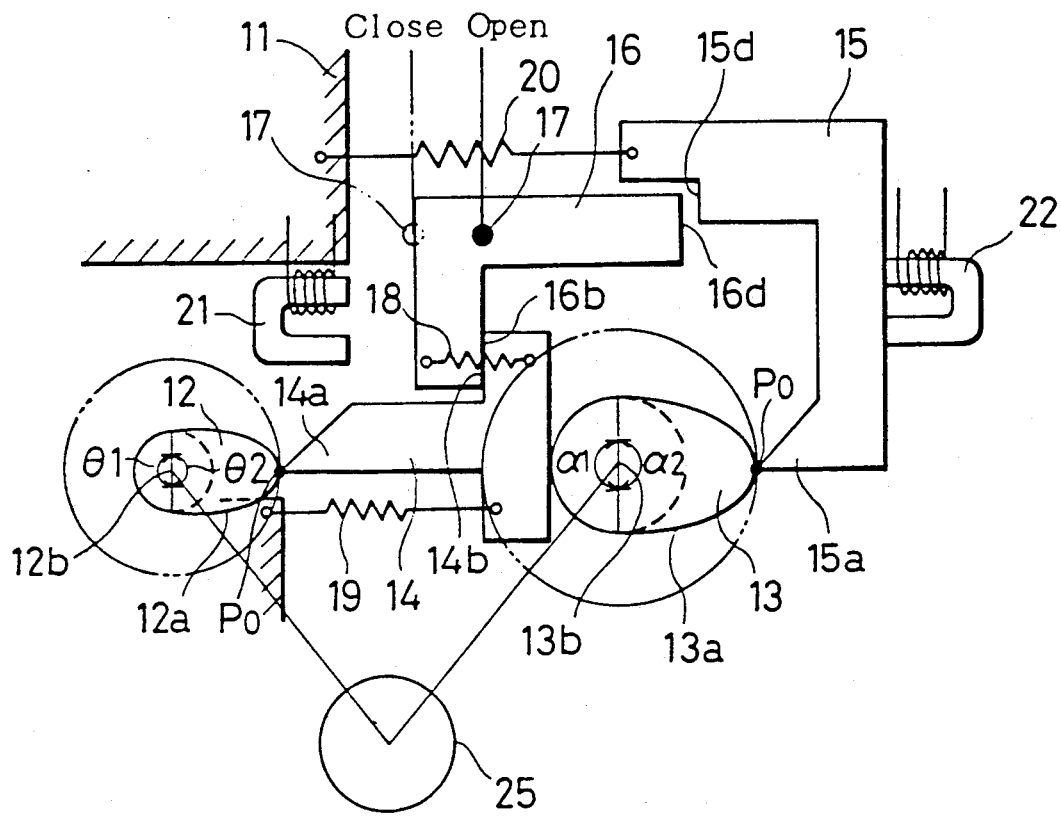
FIGS. 1A through 1G are front views showing a principle of the lens shutter device of the present invention, under different operating conditions, respectively.

The present invention will now be described with reference to the embodiments shown in the drawings.

FIGS. 1A through 1G are views showing a principle of the lens shutter device of the present invention, and FIGS. 2A through 2G are views showing an embodiment of the present invention. In FIGS. 1A through 1G, all structural members are shown as members moving linearly to the left and to the right of the figures, and in FIGS. 2A through 2G, all structural members are shown as rotatable members rotating about axes thereof. A rotational center (axis) of the rotary members shown in FIGS. 2A through 2G is shown by a suffix "p" added to each reference numeral.

As shown in the figures, a shutter opening cam 12 and a closing spring charge cam 13 are rotatably supported by a camera body 11. The camera body 11 is provided with an opening cam contact lever 14 having a follower portion (an arm) 14a which is in contact with a peripheral cam surface 12a of the shutter opening cam 12, and a shutter closing lever 15 having a follower portion (an arm) 15a which is in contact with a peripheral cam surface 13a of the closing spring charge cam 13. Further, the camera body 11 is provided with a movable shutter operating lever 16 having a shutter drive pin 17. The shutter in this embodiment has a plurality of sectors, i.e. shutter members, which open and close to carry out an exposure in association with a movement of the shutter drive pin 17. In the embodiment shown in FIGS. 2A through 2G, the shutter operating lever 16 is coaxially supported by a shaft 14p of the opening cam contact lever 14.

FIG. 3 shows an example of a relationship between the shutter drive pin 17 and a pair of shutter members 26. The shutter members 26 are rotatably supported about shafts 26a to open and close an aperture 29, respectively, and are provided with drive slits 27 in such a manner that the slits 27 overlap. The shutter drive pin 17 is inserted in the overlapping drive slits 27, and accordingly, when the shutter drive pin 17 is moved in a direction shown by an arrow, the shutter sectors 26 are rotated about the shafts 26a to open and close the aperture 29. The aperture opening condition and aperture closing condition of the shutter drive pin 17 are shown in FIGS. 1A through 1G, FIGS. 2A through 2G, and FIG. 3.

The connection of the shutter operating lever 16 with the opening cam contact lever 14 and the shutter closing lever 15 is explained as follows.

A connecting spring 18 is disposed between the opening cam contact lever 14 and the shutter operating lever 16 so that the opening cam contact lever 14 and the shutter operating lever 16 are biased toward each other. The connecting spring 18 allows the shutter operating lever 16 and the opening cam contact lever 14 to move as one body when an external force is not exerted on the shutter operating lever 16, and allows a relative movement between the opening contact lever 14 and the shutter operating lever 16 when an external force is exerted on the shutter operating lever 16. Namely, when an external force or engaging force is exerted on the shutter operating lever 16, the connecting spring 18 is flexed to accumulate energy, and thus only the opening cam contact lever 14 can be moved.

As shown in FIGS. 1A through 1G, the shutter operating lever 16 and the opening cam contact lever 14 are in contact with each other at a contact surface 16b of the shutter operating lever 16 and a contact surface 14b of the opening cam contact lever 14, and as shown in FIGS. 2A through 2G, a relative rotatable angle between the opening cam contact lever 14 and the shutter operating lever 16 is determined by an arcuate slit 14c formed in the opening cam contact lever 14 and an associated pin 16c fixed to the shutter operating lever 16 and fitted in the arcuate slit 14c.

A shutter closing spring 20 is provided between the shutter closing lever 15 and the camera body 11. The spring force of the shutter closing spring 20 is stronger than that of the connecting lever 18, and thus the shutter closing spring 20 biases the shutter closing lever 15 to move in a direction in which the shutter sectors are closed. The shutter operating lever 16 and the shutter closing lever 15 strike each other at a contact surface 16d of the shutter operating lever 16 and at a contact surface 15d of the shutter closing lever 15. After the shutter closing lever 15 is operated by a spring force of the shutter closing spring 20, so that the contact surface 16d and the contact surface 15d strike each other, the shutter operating lever 16 is moved as one body with the shutter closing lever 15 in a direction in which the shutter members 26 are closed. In the embodiment shown in FIGS. 2A through 2G, the shutter drive pin 17 corresponds to the contact surface 16d.

Note that reference numeral 19 denotes a contact spring by which the shutter opening cam 12 is held in permanent contact with the follower portion 14a of the opening cam contact lever 14.

The connecting spring 18, and the shutter closing spring 20 are shown as tension coil springs in FIGS. 1A through 1G, and as torsion coil springs in FIGS. 2A through 2G. The contact spring 19 is shown as a tension coil spring in FIGS. 1A through 1G as well as in FIGS. 2A through 2G.

A high speed mode magnet 21 is positioned adjacent to the shutter operating lever 16, and a shutter closing magnet 22 is positioned adjacent to the shutter closing lever 15. The high speed mode magnet 21 attracts the shutter operating lever 16, to restrain a movement thereof, when an electric current is applied to the magnet 21. Similarly, the shutter closing magnet 22 attracts the shutter closing lever 15, to restrain a movement thereof, when an electric current is applied to the magnet 22. In the embodiment shown in FIGS. 2A through 2G, the shutter operating lever 16 is provided with an armature arm 16e, to which an armature 21a attracted by the high speed mode magnet 21 is fixed, and the follower arm 15a of the shutter closing lever 15 is provided with an armature 22a attracted by the shutter closing magnet 22.

One revolution of the shutter opening cam 12 causes the opening cam contact lever 14 and the shutter operating lever 16 to be moved between a first position, i.e. a shutter closing position at which the shutter members 26 are closed, and a second position, i.e. a shutter opening position at which the shutter members 26 are open. Namely, the peripheral cam surface 12a of the shutter opening cam 12 has a closed shutter area (a photographing area) $\theta 1$ located an equal distance from a rotational center 12b, and a shutter opening and closing area $\theta 2$ having a radius which is gradually lengthened or shortened with regard to the shutter closing area $\theta 1$, in accordance with a rotational angle. The shutter opening cam 12 is rotated by a motor 25, and a rotational position of the motor 25 is controlled by a photointerrupter, for example, in accordance with a subject brightness device from a photometric signal. The motor 25 may be a stepping motor.

The closing spring charge cam 13 moves the shutter closing lever 15 from a third position, i.e. a release completion position at which the shutter closing lever 15 is engaged with the shutter operating lever 16, to a fourth position, i.e. a shutter set position at which the shutter closing lever 15 is not engaged with the shutter operating lever 16, so that the shutter closing spring 20 is charged. For this purpose, the closing spring charge cam 13 is provided with a releasable area $\alpha 1$ located an equal distance from a rotational center 13b of the cam 13, and a charge area $\alpha 2$ having a radius which is gradually lengthened or shortened with regard to the releasable area $\alpha 1$, in accordance with a rotational angle. The closing spring charge cam 13 is rotated by a motor 25.

Note that, in the embodiment shown in FIGS. 2A through 2G, the shutter drive pin 17 is fitted in a movement guide slit 17a provided in the camera body 11 (or a shutter mechanism), and the maximum amount of movement of the shutter closing lever 15 to a position at which the shutter is closed is restricted by a stopper pin 15f.

The shutter opening cam 12 and the closing spring charge cam 13 are controlled to achieve the operation described hereinbelow.

An engagement of the charge area $\alpha 2$ of the closing spring charge cam 13 and the follower portion 15a of the shutter closing lever 15 causes a movement of the shutter closing lever 15 to the shutter set position to charge the shutter closing spring 20. In this state, an electric current is applied to the shutter closing magnet 22 so that the shutter closing lever 15 is held at the shutter set position, and then the closing spring charge cam 13 is rotated to a position at which the releasable area $\alpha 1$ faces the follower portion 15a, and accordingly, the engagement of the shutter closing lever 15 and the closing spring charge cam 13 is released, and thus the shutter closing lever 15 becomes operable.

At this stage, engagement of the shutter opening and closing area $\theta 2$ and the follower portion 14a of the opening cam contact lever 14 causes the shutter opening cam 12 to move the opening cam contact lever 14 from a position at which the shutter is closed to a position at which the shutter is open. The rotational angle of the shutter opening cam 12 is controlled in accordance with exposure information. The rotation of the shutter opening cam 12 causes the shutter operating lever 16 to be moved together with the opening cam contact lever 14 by the connecting spring 18, whereby the shutter members 26 are rotated by the shutter drive pin 17 and the aperture 29 is opened. Then, when the amount of movement of the opening cam contact lever 14 corresponds to a subject brightness, the supply of electric current to the shutter closing magnet 22 is cut, and as a result, the shutter closing lever 15 is operated by a spring force of the shutter closing spring 20, the contact surface 15d strikes the contact surface 16d, and the shutter operating lever 16 is moved in a direction in which the shutter is closed. Namely, this operation carries out a shutter release. Note, even if a release signal is received at any point in the shutter opening and closing area $\theta 2$ of the shutter opening cam 12, basically the same operation is carried out.

When the user wants to take a picture with a high speed shutter, an electric current is supplied to the high speed mode magnet 21 so that a movement of the shutter operating lever 16 is restricted until the shutter opening cam 12 has rotated to an angular position corresponding to the photometric value. Therefore, as the shutter opening cam 12 is rotated, the connecting spring 18 is extended, and only the opening cam contact lever 14 is moved ahead, i.e., the opening cam contact lever 14 is moved to the right in FIGS. 1A through 1G, and is rotated in the clockwise direction in FIGS. 2A through 2G. Then, when a shutter release signal is given, the supply of electric current to the high speed mode magnet 21 is cut, and thereafter, the supply of electric current to the shutter closing magnet 22 is cut at a predetermined timing. Therefore, the shutter operating lever 16 is moved, by the accumulated energy of the connecting spring 18, to a shutter open position at which the shutter members 26 are open to a degree corresponding to a subject brightness, at a speed higher than that when the high speed mode magnet 21 is not supplied with an electric current. Then the shutter operating lever 16 is moved by a force of the shutter closing spring 20 to a shutter closed position at which the shutter members 26 are closed. Accordingly, a higher speed shutter operation is obtained, and therefore, the effect of camera vibration is eliminated.

Figure 2A:
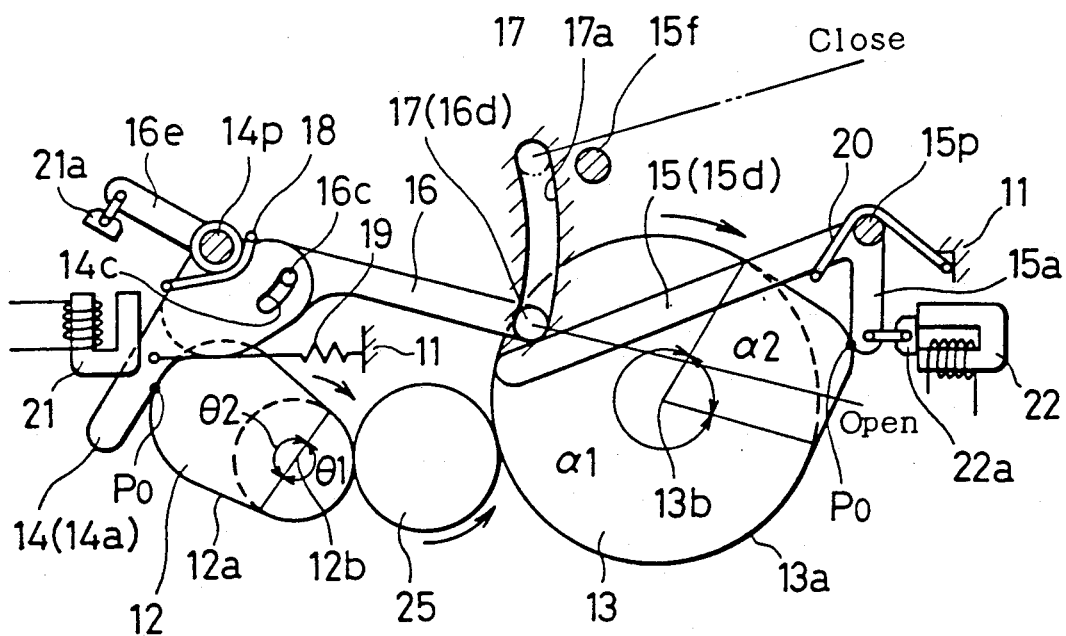
FIGS. 2A through 2G are front views showing an embodiment of the present invention, and correspond to FIGS. 1A through 1G.

The lens shutter device of the embodiment is constructed in such a manner that the rotational speeds of the shutter opening cam 12 and the closing spring charge cam 13 are synchronized, and the initial positions of the cams 12 and 13 are set as described below, so that the device can be used as a lens shutter device for a single-lens reflex camera. Namely, the shutter opening cam 12 and the closing spring charge cam 13 are controlled in such a manner that, while the closing spring charge cam 13 is rotated by one revolution, the shutter opening cam 12 is rotated by two revolutions, under the rotational control of the motor 25 and a speed reducer. As shown in FIGS. 1A and 2A, when the shutter opening cam 12 is positioned at a shutter full open position at which the shutter members 26 are fully open, the closing spring charge cam 13 is positioned at the shutter set position. Note that the shutter opening cam 12 and the closing spring charge cam 13 may be controlled in such a manner that, while the closing spring charge cam 13 rotates, the shutter opening cam 12 is rotated for a number of times which is an integral of the number of revolutions of the closing spring charge cam 13.

The operation of the lens shutter device when used in a single-lens reflex camera constructed as described above is explained below.

Figure 4:
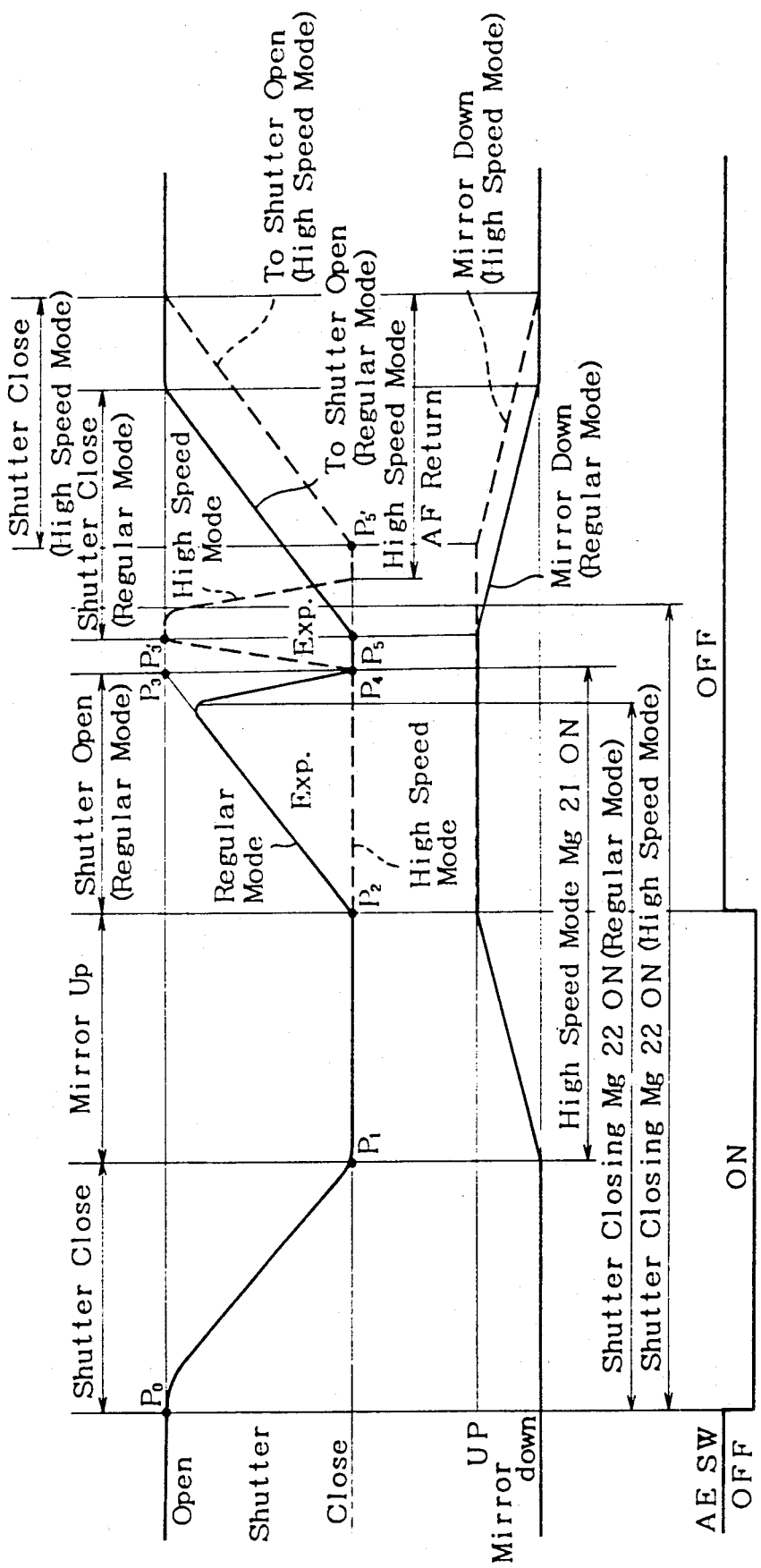
FIG. 4 is a timing chart of the case in which the lens shutter device of the present invention is used in a single-lens reflex camera.

FIG. 4 shows a timing chart for the operation of the lens shutter device. In FIGS. 1A and 2A, the opening cam 12 is positioned such that a point $p_0$ of the shutter opened and closing area $\theta2$ is in contact with the opening cam contact lever 14, and the opening cam contact lever 14 and the shutter operating lever 16 are positioned at the shutter fully open position, so that the shutter members 26, and thus the aperture 29, are fully open, whereby the user can clearly see a subject through the view finder of camera. The closing spring charge cam 13 is positioned such that the closing spring charge cam 13 is in contact with the follower portion 15a of the shutter closing lever 15 at a point $p_0$ of the charge area $\alpha2$, and the shutter closing lever 15 is positioned at the shutter set position. In this condition, neither the high speed mode magnet 21 nor the shutter closing magnet 22 is supplied with an electric current. Note, the rotational directions of the shutter opening cam 12 and the closing spring cam charge cam 13 are shown by arrows in FIGS. 2A through 2G.

Figure 1B:
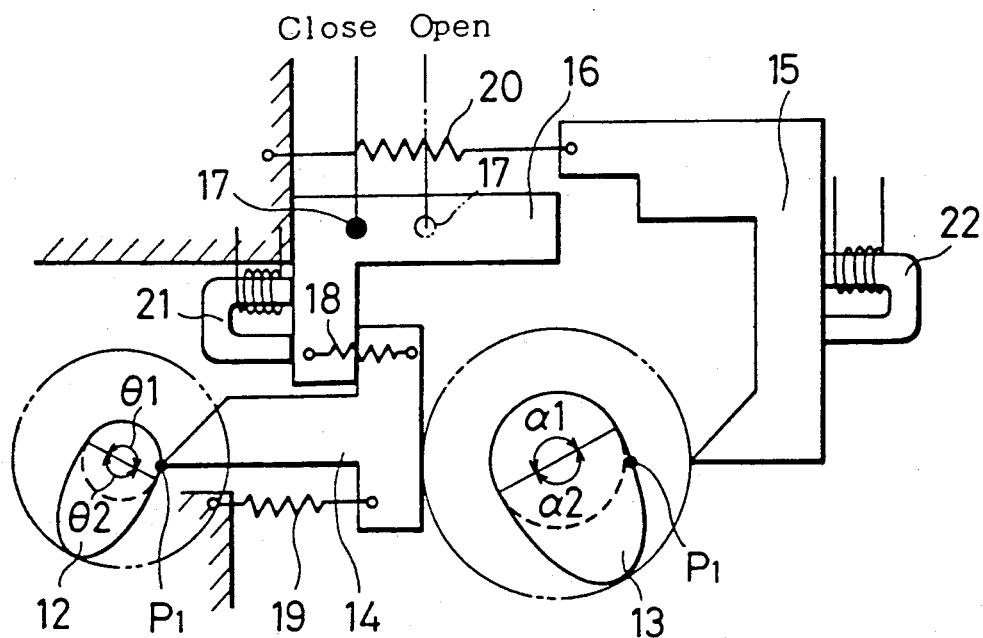
Figure 2B:
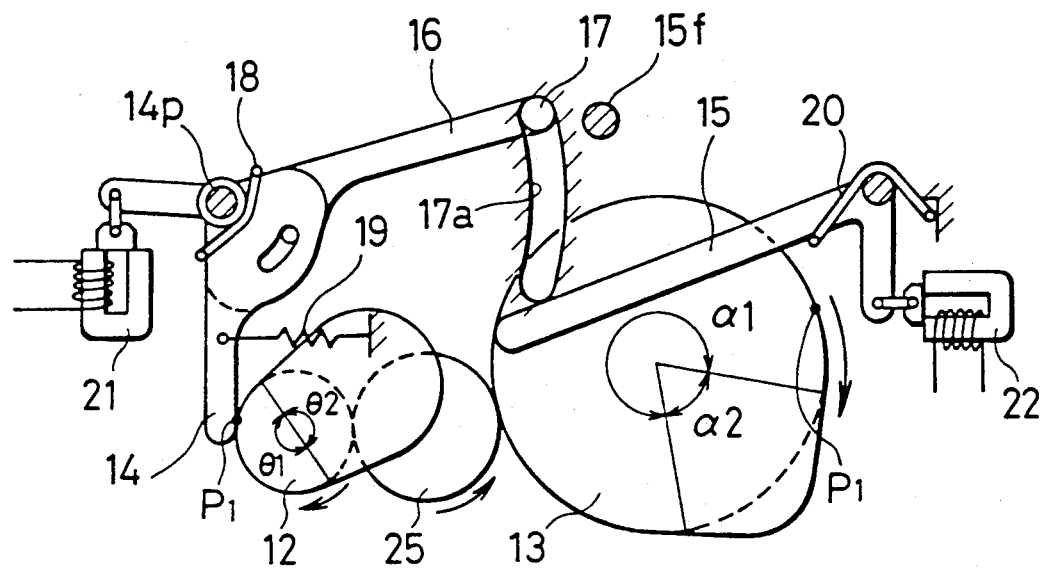

In the above condition, if a release switch is turned ON, an automatic exposure switch is also turned ON, whereby a motor is rotated and an electric current is applied to the shutter closing magnet 22. As a result, as shown in FIGS. 1B and 2B, the shutter opening cam 12 reaches a position at which a point $p_1$ in the shutter closing area $\theta1$ is in contact with the opening cam contact lever 14, and the opening cam contact lever 14 and the shutter operating lever 16 are moved to the shutter closed position by the force of the contact spring 19, and thus the shutter members 26 close the aperture 29. On the other hand, the closing spring charge cam 13 reaches a position at which a point $p_1$ of the releasable area $\alpha1$ faces the follower arm 15a of the shutter closing lever 15, so that the closing spring charge cam 13 is separated from the shutter closing lever 15. In this state, the shutter closing lever 15 is held by the shutter closing magnet 22, and therefore, is not operated. Also, at this time, as shown in FIG. 4, an upward movement of a mirror is started.

Then, when the motor 25 is further rotated, the follower portion 14a of the opening cam contact lever 14 remains in contact with the shutter closing area $\theta1$ of the shutter opening cam 12, and during this period, the photometry operation is carried out. Also during this period, as shown in FIGS. 1C and 2C, the closing spring charge cam 13 reaches a position at which a point $p_2$ in the releasable area $\alpha1$ faces the follower arm 15a of the closing lever 15, and as shown in FIG. 4, the upward movement of the mirror by a mirror upward moving mechanism (not shown) is completed.

In accordance with a subject brightness information obtained by the photometry operation, the motor 25 further rotates the shutter opening cam 12 in the shutter opening and closing area $\theta2$, by a predetermined angle. In a regular mode, an electric current is not supplied to the high speed mode magnet 21, and therefore, due to an engagement of the opening cam contact lever 14 with the shutter opening and closing area $\theta2$, the opening cam contact lever 14 and the shutter operating lever 16 are moved together in a direction in which the shutter members 26 are opened. FIGS. 1D and 2D show a state in which the opening cam contact lever 14 and the shutter operating lever 16 are moved to the shutter fully open position, at which a point $p_3$ of the cam 12 is in contact with the opening cam contact lever 14, and a point $p_3$ of the closing cam charge cam 13 faces the shutter closing lever 15. In this state, in comparison with the state shown in FIGS. 1A and 2A, the shutter opening cam 12 has been rotated by one revolution, and the closing spring charge cam 13 has been rotated by a half of one revolution.

Figure 1C:
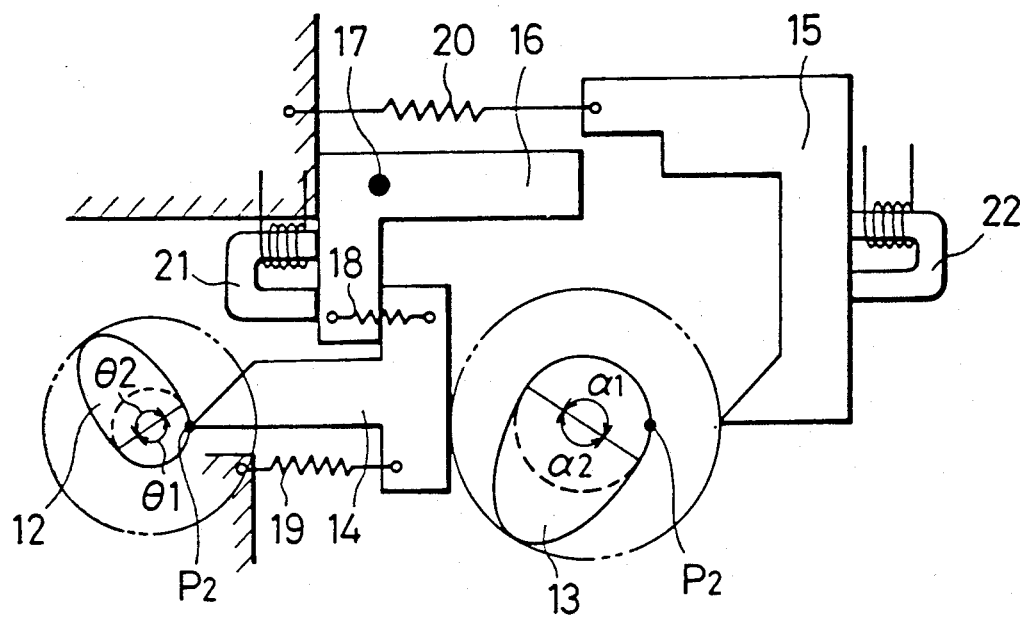
Figure 1D:
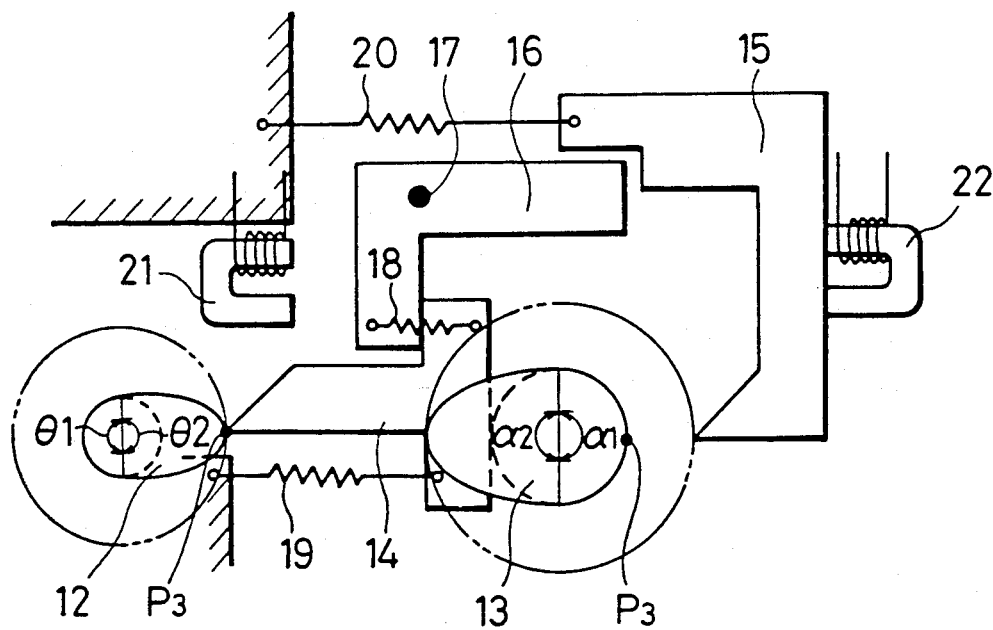
Figure 1E:
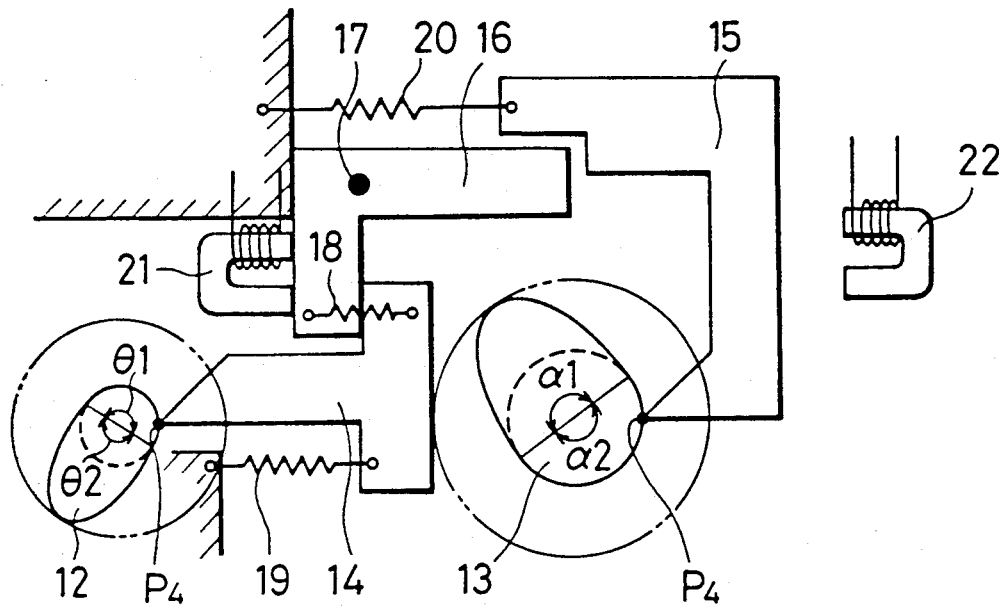
Figure 1F:
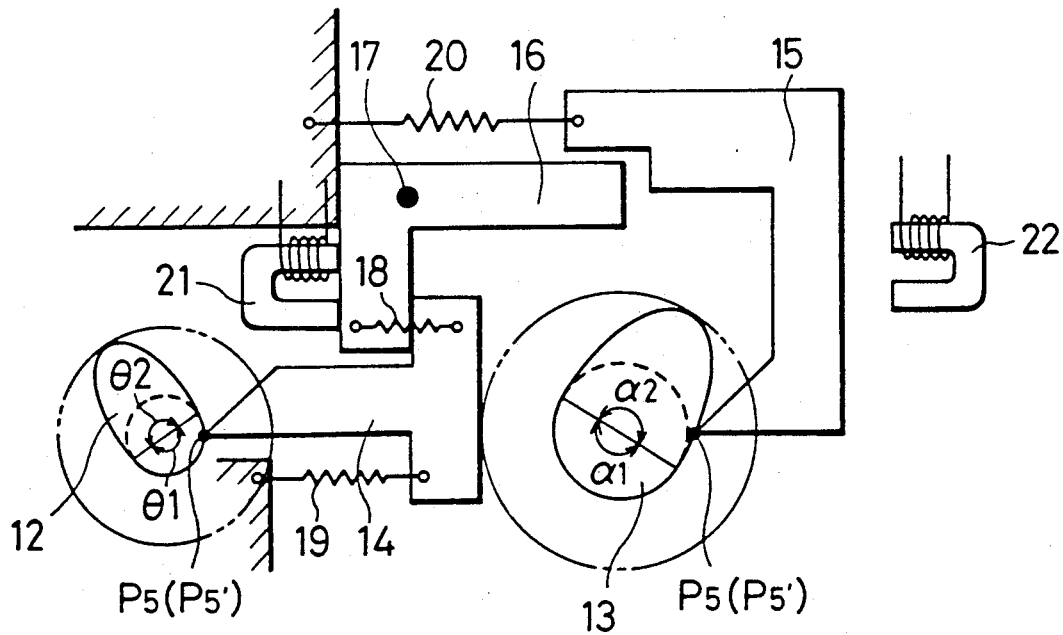
Figure 2C:
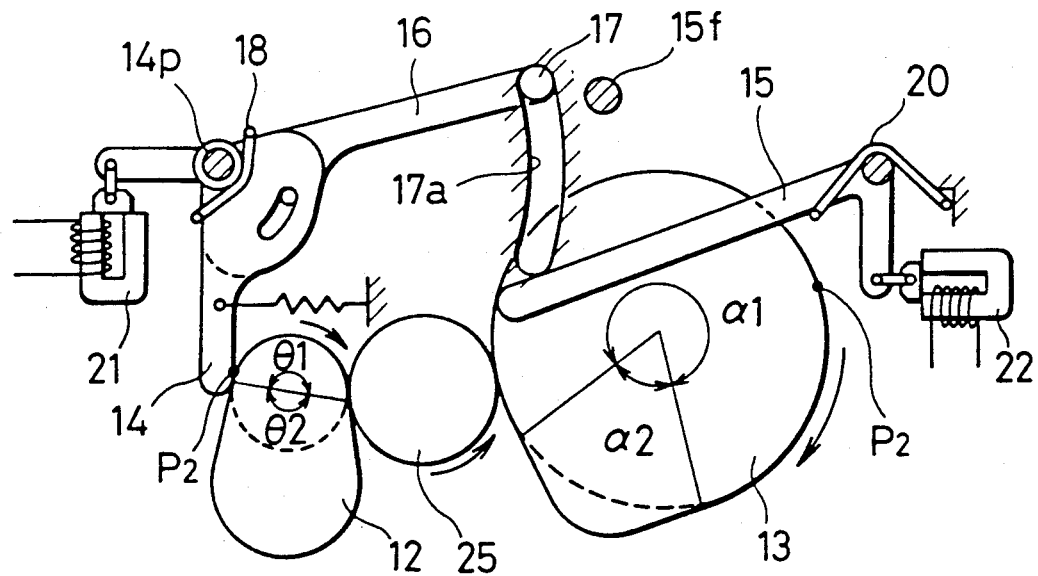
Figure 2D:
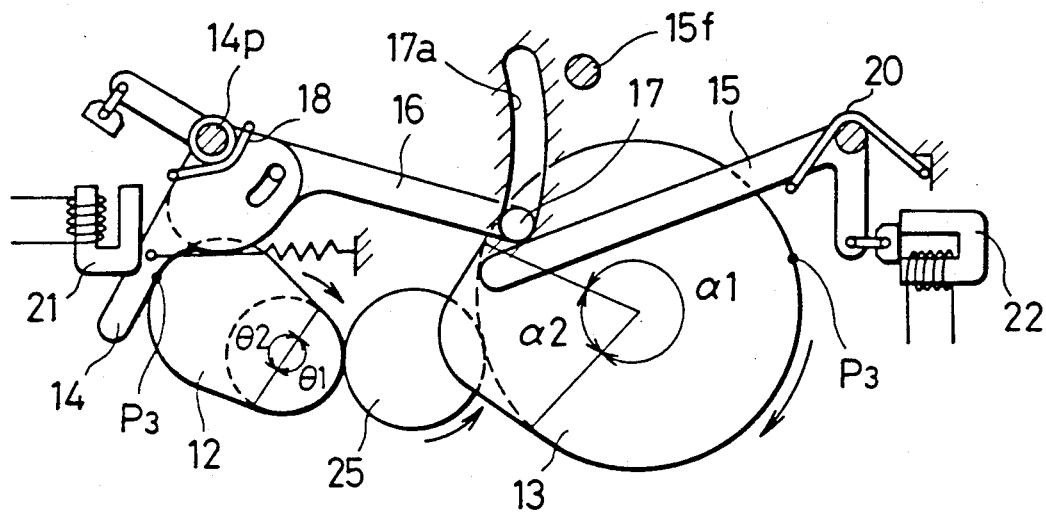
Figure 2E:
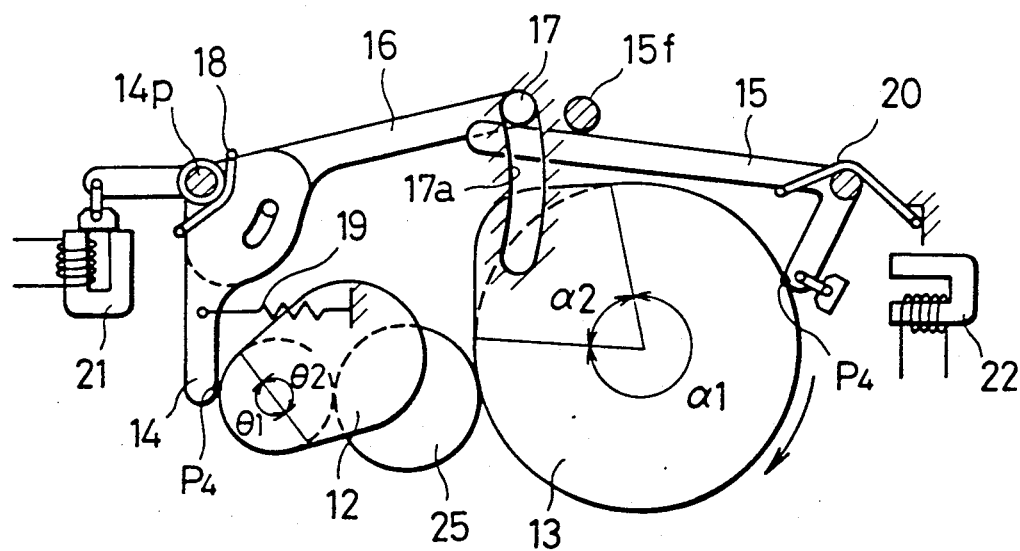
Figure 2F:
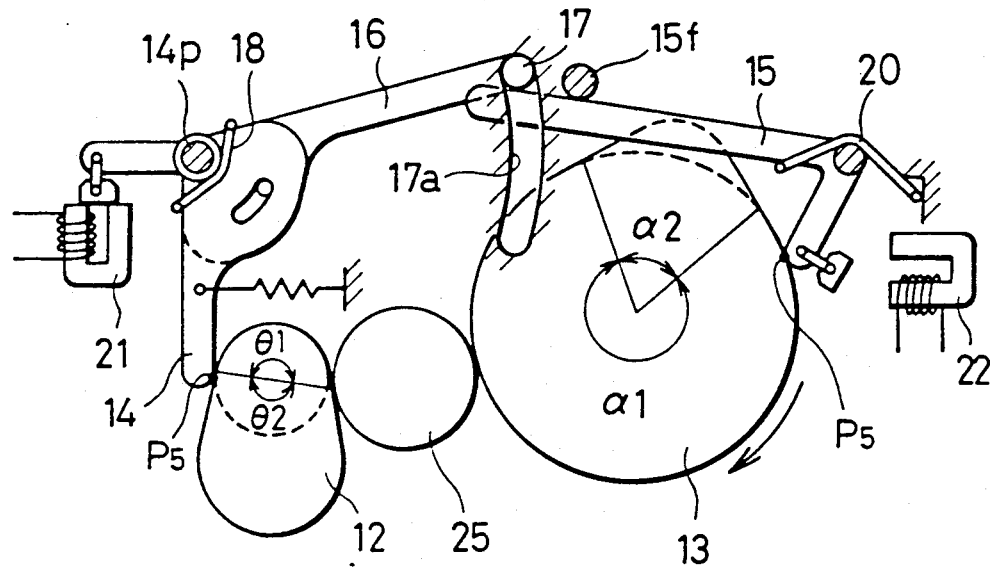

At any moment in a shutter opening step which corresponds to a state shown in FIGS. 1C and 2C through a state shown in FIGS. 1D and 2D, if a shutter closing signal (a release signal) is given, an electric current supplied to the shutter closing magnet 22 is cut, and thus the shutter closing lever 15 is operated by the force of the shutter closing spring 20. Accordingly, the contact surface 15d strikes the contact surface 16d, and thus the shutter operating lever 16 is moved to close the shutter members 26 through the shutter drive pin 17. At this time, since the closing spring charge cam 13 is positioned such that the releasable area $\alpha1$ faces the shutter closing lever 15, movement of the shutter closing lever 15 is not prevented.

Then, as shown in FIGS. 1E and 2E and 1F and 2F, the shutter opening cam 12 is rotated to the shutter closing area $\theta1$, passes through the shutter opening and closing area $\theta2$, and then returns to the state shown in FIGS. 1A and 2A. The closing spring charge cam 13 moves the shutter closing lever 15 to the shutter set position, due to an engagement there of with the releasable area $\alpha1$ and the charge area $\alpha2$, and returns to the state shown in FIGS. 1A and 2A.

Operation in a high speed shutter mode is carried out as follows.

Figure 1G:
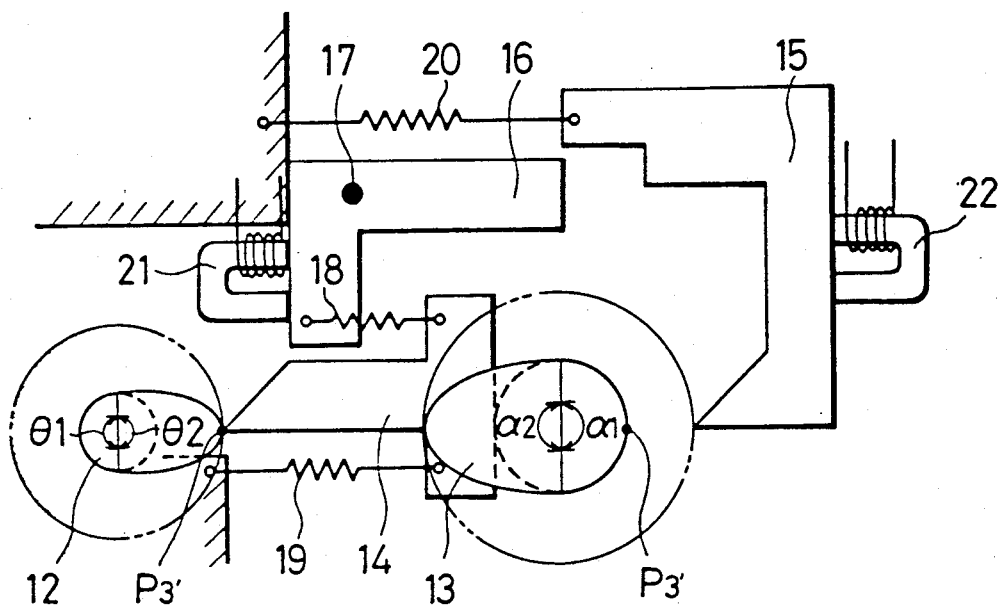
Figure 2G:
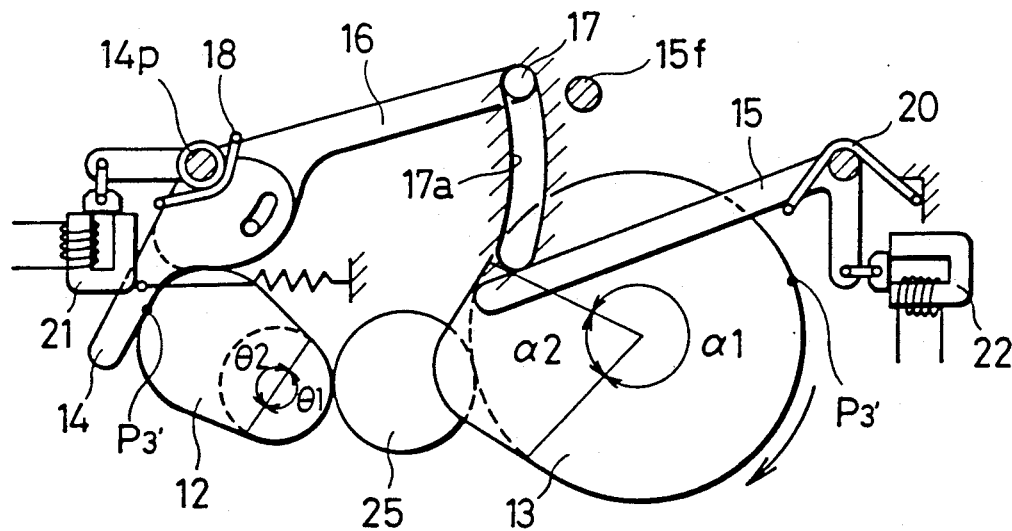

The operations shown in FIGS. 1A and 2A through FIGS. 1C and 2C are those in the regular mode. In the high speed shutter mode, immediately before the shutter opening cam 12 moves from shutter closing area $\theta1$ and reaches the shutter opening and closing area $\theta2$, an electric current is supplied to the high speed mode magnet 21, and thus movement of the shutter operating lever 16 is restricted. Therefore, when the shutter opening cam 12 is rotated, so that the opening cam contact lever 14 is moved, the connecting spring 18 is flexed or expanded as shown in FIGS. 1G and 2G, and thus energy is accumulated so that the shutter operating lever 16 can be moved in a direction in which the shutter sectors are open. Then, if the supply of electric current to the high speed mode magnet 21 is cut at a predetermined timing corresponding to a subject brightness, the shutter operating lever 16 is moved at a high speed, by a force of the connecting spring 18, to a shutter opening position determined by a rotational position of the shutter opening cam 12. A shutter closing operation caused by a cut in the supply of electric current to the shutter closing magnet 22, and the following operation, are carried out in the same way as in as the regular mode.

Therefore, in the high speed shutter mode, as understood from the timing chart shown in FIG. 4, the speed of the opening of the aperture 29 by the shutter members 26 becomes high, and thus a higher speed shutter operation is obtained.

Note that the mirror returns to the initial position after the shutter members 26 are closed.

Figure 5:
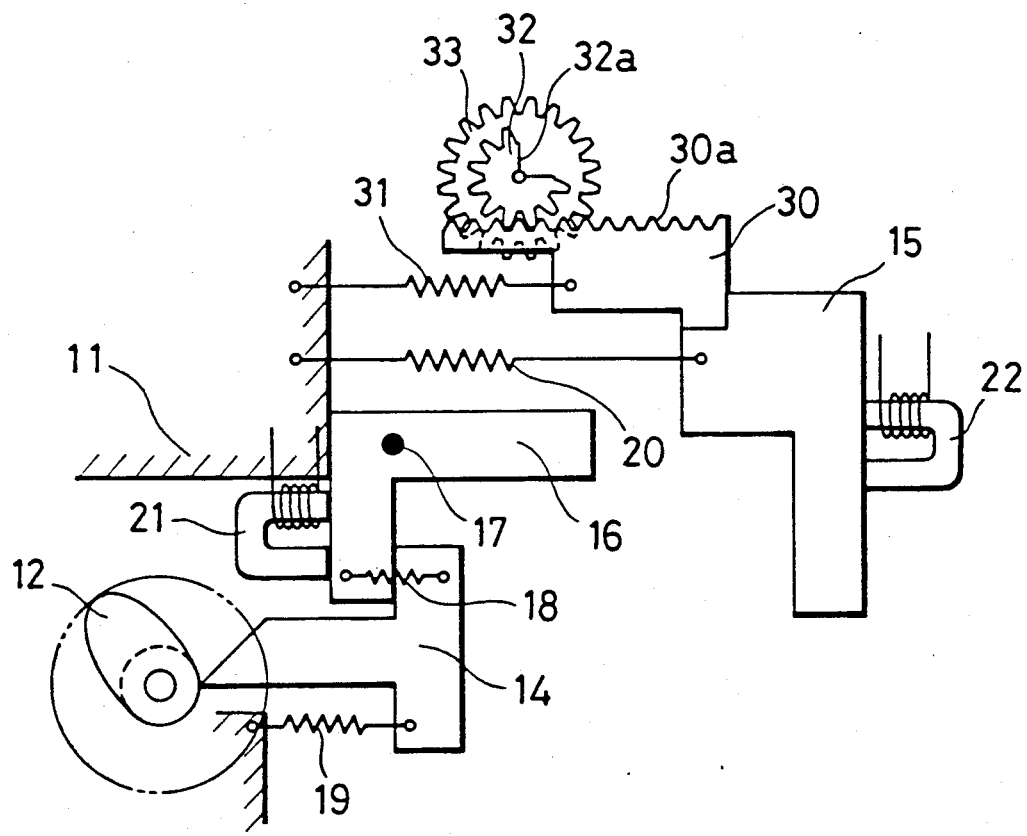
FIG. 5 is a front view showing a principle of another embodiment of the present invention.

Further note, the means for charging the shutter operating spring 20 is not necessarily the closing spring charge cam 13, but can be a lever moving linearly to and fro. FIG. 5 shows an embodiment in which the linearly moving lever 30 having a rack 30a formed thereon is fixed to the shutter closing lever 15. The linearly moving lever 30 may be formed with the shutter closing lever 15 as one body, i.e., the rack 30a is formed on the shutter closing lever 15, or the linearly moving lever 30 may be formed as a member separated from the shutter closing lever 15. A spring 31 provided between the camera body 11 and the linearly moving lever 30 urges the linearly moving lever 30 and the shutter closing lever 15 toward the camera body 11. A pinion 32 and a gear 33 are provided coaxially to each other and fixed as one body; the gear 33 is meshed with a gear train connected to the motor 25 shown in FIG. 1A, to rotate in synchronization with the shutter opening cam 12, and the pinion 32 is meshed with the rack 30a of the linearly moving lever 30, except for a notch 32a thereof which is not meshed with the rack 30a. The remaining constructions is the same as that of the embodiment shown in FIGS. 1A through 1G and 2A through 2G, except that the closing spring charge cam 13 is not provided.

The operation of the above embodiment shown in FIG. 5 is described below. In a usual shutter operation, when charging the shutter closing spring 20, the shutter operating cam 12 is rotated so that the opening cam contact lever 14 and the shutter operating lever 16 are moved to the right in the drawing, and at the same time, the pinion 32 is rotated so that the linearly moving lever 30 and the shutter closing lever 15 are also moved to the right. When the shutter closing spring 20 is charged and the shutter closing lever 15 approaches the shutter closing magnet 22, an electric current is applied to the shutter closing magnet 22 and the shutter closing lever 22 is attracted by the megnet 22 and fixed thereto. In this state, the notch 32a faces the rack 30a, and therefore the pinion 32 and the rack 30a are not in mesh with each other, and thus the shutter closing lever 15 and the linearly moving lever 30a are able to move to the left. At a time determined by a subject brightness, the supply of electric current to the shutter closing magnet 22 is cut, and thus the shutter closing lever 15 and the linearly moving lever 30 are moved to the left by the force of the spring 20. As a result, the shutter closing lever 15 strikes the shutter operating lever 16, whereby the lever 16 is moved to the left to carry out a shutter release.

As described above, the operation of the embodiment shown in FIG. 5 is basically the same as that of the first embodiment shown in FIGS. 1A through 1G and 2A through 2G, not only in a usual speed shutter operation but also in a high speed shutter operation.

Although the embodiments of the present invention have been described herein with reference to the accompanying drawings, obviously many modifications and changes may be made by those skilled in this art without departing from the scope of the invention.

I claim:

1. A lens shutter device for a camera, said device including shutter members which open and close to carry out an exposure, said device comprising:
    a shutter operating lever movable to open and close said shutter members in accordance with the positions of said shutter operating lever;
    a first lever movable between a first position and a second position;
    a connecting spring connecting said first lever and said shutter operating lever so that said first lever and said shutter operating lever are biased toward each other, said connecting spring allowing said first lever and said shutter operating lever to move together when no external force is exerted on said shutter operating lever, and allowing relative movement between said first lever and said shutter operating lever when an external force is exerted on said shutter operating lever;
    a closing spring having a spring force which is stronger than the spring force of said connecting spring;
    a second lever movable between a third position at which said second lever is engaged with said shutter operating lever and a fourth position at which said second lever is not engaged with said shutter operating lever, said second lever being urged by said closing spring to strike against said shutter operating lever;
    means for charging said closing spring by moving said second lever, against the spring force of said closing spring, from said third position to said fourth position; and
    means for controlling said second lever such that said second lever is held at said fourth position after said second lever is moved to said fourth position by said charging means, and when a closing signal is input to said control means, said second lever is released and moved to engage with said shutter operating lever, so that said shutter operating lever is moved by said closing spring toward a position at which said shutter members are closed.

2. A device according to claim 1, wherein said shutter operating lever has a pin engaging with said shutter members, to open and close said shutter members.

3. A device according to claim 1, further comprising a shutter opening cam engaging said first lever, and rotating to move said first lever between said first position and said second position.

4. A device according to claim 3, wherein a rotational angle of said shutter opening cam is controlled in accordance with a subject brightness measured by a photometric device.

5. A device according to claim 3, wherein said charging means includes a charge cam engaging with said second lever, and rotating to move said second lever between said third position and said fourth position, said charge cam rotating by one revolution to move said second lever between said third position and said fourth position, and said shutter opening cam rotating by one revolution to move said first lever between said first position and said second position.

6. A device according to claim 5, wherein the rotation of said charge cam and the rotation of said shutter opening cam are synchronized.

7. A device according to claim 6, wherein said charge cam and said shutter opening are controlled in such a manner that, while said charge cam rotates by one revolution, said shutter opening cam rotates an integral number of rotations of said charge cam, and said shutter opening cam is positioned such that said shutter members are fully open when said charge cam is at said fourth position.

8. A device according to claim 1, wherein said first position corresponds to a position at which said shutter members are closed, and said second position corresponds to a position at which said shutter members are open.

9. A device according to claim 1, wherein said third position corresponds to a release completion position at which a shutter release is completed, and said fourth position corresponds to a shutter set position at which said closing spring is charged.

10. A device according to claim 1, wherein said charging means includes a charge cam engaging said second lever, and rotating to move said second lever between said third position and said fourth position.

11. A device according to claim 1, wherein said charging means includes a linearly moving lever coupled to said second lever, and moving linearly to and fro.

12. A device according to claim 11, wherein said charging means further includes a rack formed on said linearly moving lever, and a pinion meshing with said rack and connected to a drive source.

13. A device according to claim 1, further comprising means for holding said shutter operating lever such that a movement of said shutter operating lever is restrained and said connecting spring is charged when said first lever is moved from said first position toward said second position, said holding means releasing the restraint of said shutter operating lever when a release signal is input to said holding means.

14. A device according to claim 1, wherein said control means includes a shutter closing magnet for attracting and holding said second lever.

15. A device according to claim 13, wherein said holding means includes a high speed mode magnet for attracting and holding said shutter operating lever.

16. A lens shutter device including shutter members, said device comprising:
   an opening cam contact lever controlled by a rotatable shutter opening cam to be moved between a shutter closing position and a shutter opening position;
   a shutter operating lever having a drive pin moved in association with said shutter members, and opening and closing said shutter members in accordance with a position of said drive pin;
   connecting spring means for connecting said opening cam contact lever and said shutter operating lever, said connecting spring means biasing said opening cam contact lever and said shutter operating lever a manner that said opening cam contact lever and said shutter operating lever are urged toward each other, said connecting spring means allowing said opening cam contact lever and said shutter operating lever to move as one body when an external force is not exerted on said shutter operating lever, and allowing a relative movement between said opening cam contact lever and said shutter operating lever when an external force is exerted on said shutter operating lever;
   a shutter closing lever urged toward a position at which said shutter members are closed by a shutter closing spring means having a spring force greater than a spring force of said connecting spring means, and able to strike against said shutter operating lever;
   charge means for moving said shutter closing lever against the spring force of said shutter closing spring means for a release completion position at which said shutter closing lever is engaged with said shutter operating lever to a shutter set position at which said shutter closing lever is not engaged with said shutter operating lever; and
   a shutter closing means holding said shutter closing lever at said shutter set position to which said shutter closing lever is moved by said charge means, and when a shutter closing signal is output to said shutter closing means, said shutter closing means releasing said shutter closing lever so that said shutter closing spring means moves said shutter operating lever toward a position at which said shutter members are closed.

17. A lens shutter device for a camera, said device including shutter members which open and close to carry out an exposure, said device comprising:
   a shutter operating lever movable to open and close said suttter members in accordance with a position of said shutter operating lever;
   a first lever movable between a first position and a second position;
   a first spring connecting said first lever and said shutter operating lever so that said lever and said shutter operating lever are biased toward each other, said first spring allowing said first lever and said shutter operating lever to move together when no external force is exerted on said shutter operating lever, and allowing a relative movement between said first lever and said shutter operating lever when an external force is exerted on said shutter operating lever;
   a second spring having a spring force which is stronger that the spring force of said first spring; and
   a second lever movable between a third position at which said second lever is engaged with said shutter operating lever and a fourth position at which said second lever is not engaged with said shutter operating lever, said second lever being urged by said second spring to strike against said shutter operating lever.

* * * * *

UNITED STATES PATENT AND TRADEMARK OFFICE
CERTIFICATE OF CORRECTION

PATENT NO. : 5,117,248
DATED : May 26, 1992
INVENTOR(S) : M. HORI

It is certified that error appears in the above-indentified patent and that said Letters Patent is hereby corrected as shown below:

```
    Column 12, line 27 (claim 17, line 5), change "suttter"
to ---shutter---.
```

Signed and Sealed this

Second Day of August, 1994

Attest:

BRUCE LEHMAN

Attesting Officer     Commissioner of Patents and Trademarks